United States Patent [19]

Flair

[11] 4,184,264
[45] Jan. 22, 1980

[54] GEROTOR INTERNAL GEAR TESTING

[75] Inventor: Henry J. Flair, Franklin Park, Ill.

[73] Assignee: Illinois Tool Works Inc., Chicago, Ill.

[21] Appl. No.: 940,814

[22] Filed: Sep. 11, 1978

[51] Int. Cl.² .............................................. G01B 5/20
[52] U.S. Cl. .............................................. 33/179.5 C
[58] Field of Search ......... 33/179.5 C, 147 M, 174 Q, 33/181 R, 179.5 R, 179.5 A, 179.5 B, 179.5 D; 90/3; 51/287, DIG. 1, 95 GH

[56] References Cited

U.S. PATENT DOCUMENTS

| 2,849,802 | 9/1958 | Stapleton | 33/179.5 B |
| 3,314,157 | 4/1967 | Motz et al. | 33/179.5 B |
| 4,058,938 | 11/1977 | Härle et al. | 51/287 |

Primary Examiner—Willis Little
Attorney, Agent, or Firm—Glenn W. Bowen; Robert W. Beart

[57] ABSTRACT

A master star gear, or rotor, for testing the dimensions of an internal toothed ring gear, or stator, of a gerotor hydraulic mechanism is provided by truncation of the teeth of a mating star gear rotor so that the center-to-center variation that occurs between the centers of the ring gear and the star gear along a line may be detected and measured in order to measure the magnitude of the manufacturing errors that are present in the ring gear. The ring gear is held in place on a rotating support member by a friction fit against flats on an arbor of the support member.

2 Claims, 5 Drawing Figures

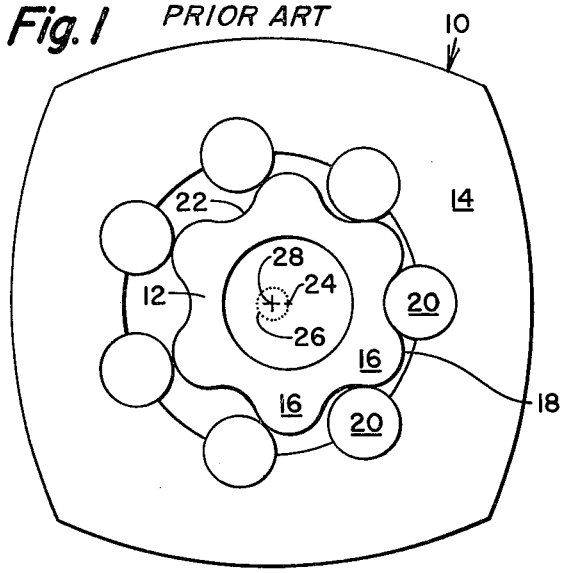
Fig. 1 PRIOR ART
Fig. 2
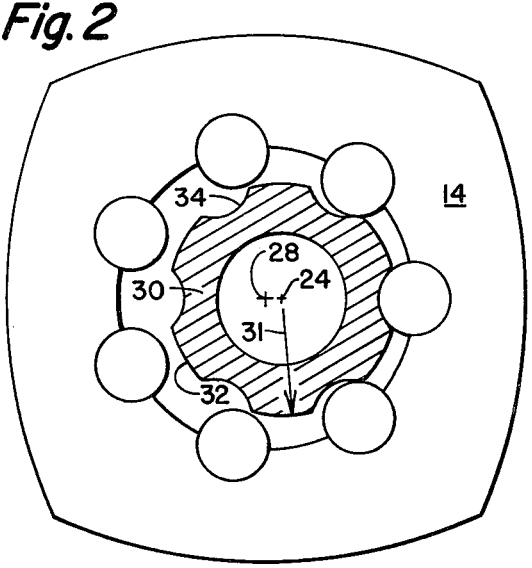
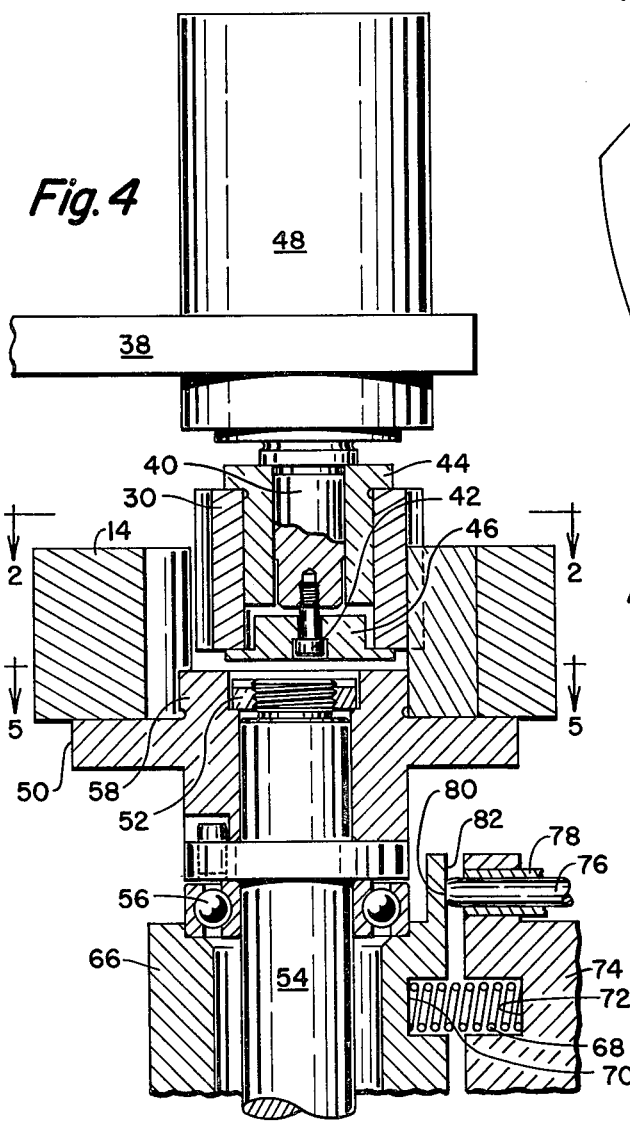
Fig. 4
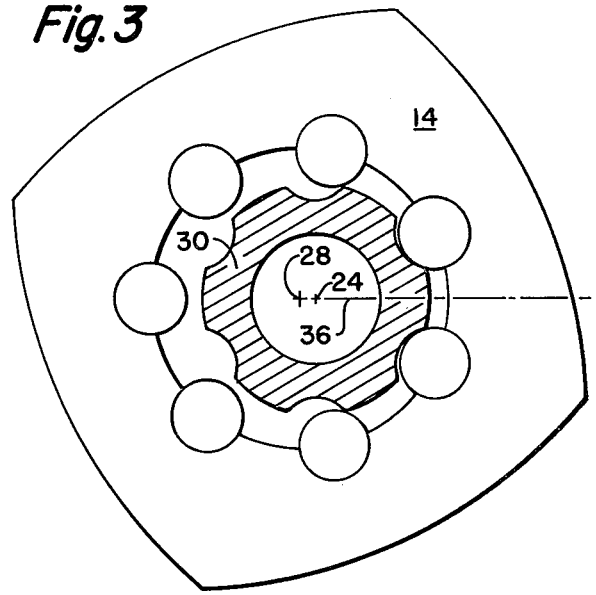
Fig. 3
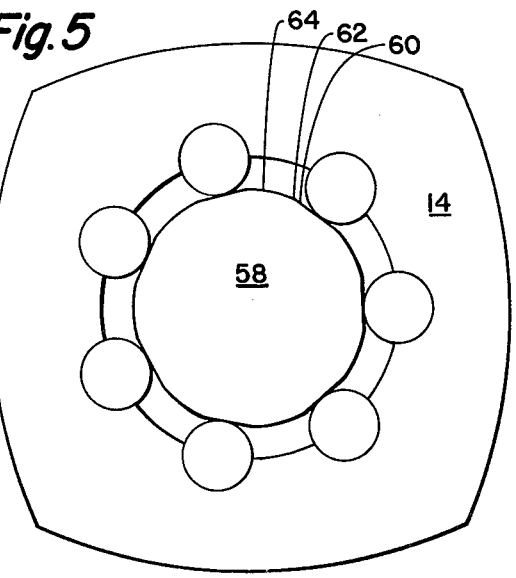
Fig. 5

GEROTOR INTERNAL GEAR TESTING

BACKGROUND OF THE INVENTION

Hydraulic devices which have a series of expandable and contractible fluid chambers that are formed by an external toothed gerotor rotor that intermeshes with internal toothed stator during relative orbital and rotational movement are extensively used. The internal teeth of the stator are often constructed of cylindrically shaped rollers that are free to rotate in recesses in the stator while in engagement with a tooth of the rotor so as to seal a high pressure zone of the hydraulic device from a low pressure zone. The external toothed rotor, or star gear, has one less tooth than the internal toothed stator, or ring gear. The star gear thus partakes of a hypocycloidal movement so that the axis of the star gear travels in orbit above the axis of the internal ring gear.

A machine for accurately testing the profile of the external toothed rotor was developed and is disclosed in United States patent application Ser. No. 793,976 which is assigned to the assignee of the present invention and was filed in the name of Henry J. Flair. Although go and no go gages conceivably might be used to determine whether or not an internal toothed stator was within allowed tolerances in a gerotor mechanism, these gages would be of limited utility and accuracy since they would not have the shape of the external toothed rotor, and they will not be capable of detecting the source of any interference errors that may exist. The use of a master gear having the shape of a gerotor rotor is not possible, however, because when an external toothed rotor is inserted into the internal toothed stator of a gerotor device the overlap is such that the variation in the center-to-center distance between the centers of the rotor and the stator can not be detected.

The present invention is directed to an external toothed rotor that serves as a master gear and that has a tooth form which is modified from that of an operating star gear rotor. A mechanism for centering and quick release holding of the internal toothed stator on an arbor of a rotatable support member, so that the star gear rotor rotates about its center as the ring gear rotates about its center, is also provided. The external toothed rotor is positioned relative to the internal toothed stator so that the centers of the rotor and the stator remain positioned along the same lines at all times. With the rotor center being fixed and the stator center being slidable along this line, a measuring device can be coupled to detect the motion of the stator relative to the rotor thereby indicating the magnitude of manufacturing variations of the internal toothed stator from an ideal stator.

Prior to the present invention, it was customary to assemble the internal and external tooth gears together and to operate the device to see if satisfactory operation was obtainable, and if not, to disassemble the device. Sometimes this same rotor and stator would be used in a different assembly to see if they might work in combination with a new mating gear. The present invention provides a means of accurately predicting the operation of an internal toothed gear with respect to an external toothed rotor, so as to thereby eliminate repeated assembly and disassembly operations in the manufacture of gerotor devices.

DESCRIPTION OF THE DRAWINGS

The present invention is described by reference to the drawings in which:

FIG. 1 is a top view of a conventional gerotor mechanism having a six toothed external gear rotor and a seven toothed internal gear stator;

FIG. 2 is a top view of the internal toothed stator of FIG. 1 and external toothed master gear rotor constructed in accordance with the present invention in one relative position taken along the line 2—2 of FIGS. 4-5;

FIG. 5 represents a second relative position of the internal toothed stator and the external toothed master gear rotor of FIG. 2 taken along the line 2—2 of FIG. 4;

FIG. 4 represents a partial cross-sectional view of a portion of a modified conventional gear checking machine which may be utilized to measure the interference error that occurs between the master gear rotor and stator of FIGS. 2 and 3; and FIG. 5 is a cross-sectional view which shows a quick release locking arbor for locating and securing the internal toothed stator on the checking machine of FIG. 4 taken along the line 5—5 of FIG. 4.

TECHNICAL DESCRIPTION OF THE INVENTION

A conventional gerotor hydraulic device 10 is illustrated in FIG. 1. This device has a six toothed external gear rotor 12 which rotates inside a seven toothed internal gear stator 14. The teeth 16 of the rotor 12 are each formed with a node, such as the node 18, which project between the internal teeth 20 of the stator in order to compress the fluid located therebetween. The nodes 18 and valleys 22 of the teeth 16 of the rotor 12 make contact with the internal teeth 20. In fact, all seven internal teeth (rollers) are in contact with the conventional gerotor making it difficult to distinguish where errors exist.

As the internal gear 12 and the external gear 14 rotate relative to one another, the center 24 of the rotor rotates in an orbit, as indicated by the dotted lines 26, about the center 28 of the stator. During this relative rotation of the stator and rotor gears, the valleys and nodes of each external tooth of the rotor 12 will come into contact with the internal teeth 20 of the stator 14 over a portion of the profile of the tooth. The internal teeth 20 may consist of rollers which are located in recesses that allow the rollers to rotate therein.

Despite the orbiting motion of the center 24 of the rotor gear 12 about the center 28 of the stator gear 14, there is no way to measure internal gear interference error in the configuration of FIG. 1, because of the large overlap that occurs between the stator and rotor in this type of device, due to the fact that the portion of the valley 22 may engage any of the internal teeth 20 of the stator 14 of a variable length.

In FIG. 2, the internal toothed stator 14 which is to be checked is shown in one position with respect to an external toothed master gear rotor 30. The element numbers of FIGS. 2-5 correspond to those of FIG. 1 where applicable. The master gear rotor 30 like a conventional star gear will have a center 24 which will rotate and not orbit 26 about the center 28 of the stator 14. The significant difference between the master gear 30 and a normal star gear 12 is that the nodes 18 of the star gear 12 has been reduced in size to form the truncated portions 32 so that the valleys 34 of the master gear 30 each have a curved surface length which is substantially equal to the length that a perfect star gear rotor would travel in contact with a perfect stator. The truncated portions 32, therefore, follow a circular curvature and occur at the radius 31 of the master gear 30 that allows for minimum overlap of metal-to-metal mesh of the master gear rotor 30 with the stator 14, in order that the maximum variation in the center-to-center distance of the centers 24 and 28 may be measured.

FIG. 3 shows a second position wherein the stator 14 and the master gear rotor 30 have undergone a relative rotation with respect to each other from the position shown in FIG. 2 which allows for center-to-center difference of the centers 24 and 28 along the imaginary line 36 to be measured as the gears move from the position of FIG. 2 to that of FIG. 3.

FIG. 4 represents a cross-sectional view of a portion of a modified parallel axis, center distance gear checking machine which may be utilized to implement the present invention. An example of a machine suitable for such use is a model No. 2276 gear checking machine which is sold by Illinois Tool Works Inc. With this type of machine, a master gear is generally aligned so that its axis is parallel to the axis of the gear being checked and the two gears are rotated together. The axis of the master gear is fixed and the axis of the gear being checked is allowed to be displaced from the axis of the gear being checked. The machine of FIG. 4 is modified from the conventional machine so that the support arm 38 allows the master gear 30 to be mounted in the stator 14. The master gear 30 is secured to rotate with a shaft 40 by means of a screw 42 threaded into the shaft 40 and a two-piece locking member 44, 46. The shaft 40 extends from a rotatable non-driven spindle 48. The internal toothed gear 14 rests on a rotatable support plate 50 which is secured by means of a cap nut 52 that threads onto the end of the driven shaft 54. The plate 50 rides on ball bearings 56 to insure smooth, frictionless movement. The center of the shaft 40 is thus slightly displaced from the center of the shaft 54 thereby insuring the initial displacement of the centers 24, 28 of the rotor and stator gears along the line 36.

A support arbor 58 for the internal toothed gear 14 extends upwardly from the support plate 50. The outside of the arbor 58 is formed with the flat sections 60 which are equal in number to the number of internal teeth on the ring gear 14. These flat sections 60 join circular sections 64 at the corners 62, so that the gear 14 can be locked onto the arbor 58 merely by twisting the gear 14 relative to the arbor 58 so as to thereby achieve frictional locking of the ring gear 14 against the arbor 58 at the corners 62.

Since the master gear 30 is mounted to a live spindle 48, it will rotate as the internal toothed gear 14 is rotated. The centers 24 and 28 remain aligned along the line 36, as previously mentioned, regardless of the relative rotational position of the rotor master gear 30 and the stator 14, as shown in FIGS. 2 and 3. As the master gear 30 and the internal toothed gear 14 rotate relative to one another, the center-to-center distance of the centers 24 and 28 will vary. The center 24 of the master rotor gear 30 is fixed due to the fixed location of the live spindle 48. However, the internal gear 14 is mounted on moveable base 66 that engages a coil spring 68 that has one end positioned in a recess 70 of the base 66. The other end of the spring 68 is positioned in the recess 72 located in a fixed frame member 74. A sensing probe 76 passes through a bushing 78 in the frame member 74 and is coupled at its other end conventional sensing device (which is not shown) which is also fixed in place relative to the moveable base 66. The outer end 80 of the sensing probe 76 contacts the ledge 82 of the moveable base 66. In this manner, the center-to-center displacement of the centers 24, 28 during relative rotation of the master rotor 30 and the stator 14 that is being checked may be determined, and recorded if desired. Thus, with the present invention internal toothed gerotor stator gears may be checked prior to assembly whereby the expense and time previously involved in assembling and disassembling stator and rotor gear combinations that were out of tolerance may be avoided.

What is claimed is:

1. A gear checking mechanism comprising a master gerotor rotor test gear having a plurality of teeth with nodes and valleys, wherein said nodes are truncated at a radius such that each of said valleys are thereby provided with a curvature that has a length which is substantially equal to the length that the valley of a perfect gerotor rotor gear would be in contact with the tooth of a perfect gerotor stator gear, first means for securing the center of said master rotor gear at a fixed location and for allowing for the rotation of said master rotor gear, second means for locating the center of a gerotor stator gear so that it is spaced along an imaginary line from the center of said master rotor gear, and for rotating said gerotor stator gear, said second means being constructed so as to be displaceable along said imaginary line from the fixed center of said master rotor gear, and third means responsive to the displacement of said second means for providing a measure of the deviation of the center-to-center distances of said gerotor master rotor gear and said gerotor stator gear that is being checked; wherein said second means comprises a projecting arbor having a plurality of flat sections on it that are equal in number to the number of internal teeth that are on the gerotor stator gear so that said gerotor stator gear teeth frictionally engages said arbor thereby locking said gerotor stator gear to said arbor when said gerotor stator gear is rotated relative to said arbor.

2. A gear checking mechanism comprising a master gerotor rotor test gear having a plurality of teeth with nodes and valleys, wherein said nodes are truncated at a radius such that each of said valleys are thereby provided with a curvature that has a length which is substantially equal to the length that the valley of a perfect gerotor rotor gear would be in contact with the tooth of a perfect gerotor stator gear, first means for securing the center of said master rotor gear at a fixed location and for allowing for the rotation of said master rotor gear, second means for locating the center of a gerotor stator gear so that it is spaced along an imaginary line from the center of said master rotor gear, and for rotating said gerotor stator gear, said second means being constructed so as to be displaceable along said imaginary line from the fixed center of said master rotor gear, and third means responsive to the displacement of said second means for providing a measure of the deviation of the center-to-center distances of said gerotor master rotor gear and said gerotor stator gear that is being checked; wherein said master gerotor rotor gear is supported inside said gerotor stator gear at the end of a live spindle which allows said master gerotor gear to rotate in response to the rotation of said gerotor stator gear.

* * * * *